(12) United States Patent
Petzold et al.

(10) Patent No.: US 8,187,148 B2
(45) Date of Patent: May 29, 2012

(54) CLUTCH SYSTEM

(75) Inventors: Rainer Petzold, Friedrichshafen (DE);
Martin Miller, Immenstaad (DE);
Mario Steinborn, Friedrichshafen (DE);
Peter Herter, Ravensburg (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 740 days.

(21) Appl. No.: 12/374,078

(22) PCT Filed: Jun. 29, 2007

(86) PCT No.: PCT/EP2007/056545
§ 371 (c)(1),
(2), (4) Date: Jan. 16, 2009

(87) PCT Pub. No.: WO2008/015061
PCT Pub. Date: Feb. 7, 2008

(65) Prior Publication Data
US 2010/0016119 A1 Jan. 21, 2010

(30) Foreign Application Priority Data
Jul. 29, 2006 (DE) .................. 10 2006 035 134

(51) Int. Cl.
*B60W 10/00* (2006.01)

(52) U.S. Cl. ........................................................ 477/70
(58) Field of Classification Search .................. 477/143, 477/147, 145, 146, 150, 153, 155, 158; 192/3.58
See application file for complete search history.

(56) References Cited

U.S. PATENT DOCUMENTS

| | | | | |
|---|---|---|---|---|
| 4,936,430 | A * | 6/1990 | Shikata | 192/3.58 |
| 5,787,710 | A * | 8/1998 | Baeuerle | 60/468 |
| 6,253,137 | B1 | 6/2001 | Abo et al. | |
| 6,467,262 | B1 * | 10/2002 | Baeuerle | 60/403 |
| 6,789,658 | B2 * | 9/2004 | Busold et al. | 192/103 F |
| 6,955,629 | B2 * | 10/2005 | Nishida et al. | 477/143 |
| 7,163,096 | B2 | 1/2007 | Neuner | |
| 7,338,408 | B2 | 3/2008 | Petrzik et al. | |
| 7,410,438 | B2 * | 8/2008 | Moehlmann et al. | 475/116 |
| 7,464,618 | B2 * | 12/2008 | Mohlmann et al. | 74/346 |
| 7,510,496 | B2 * | 3/2009 | Long et al. | 475/123 |
| 7,572,203 | B2 * | 8/2009 | Kashiwagi et al. | 477/34 |
| 2001/0030099 | A1 * | 10/2001 | Fliege | 192/91 A |
| 2004/0029677 | A1 | 2/2004 | Mori et al. | |

(Continued)

FOREIGN PATENT DOCUMENTS

| DE | 2 222 184 A1 | 1/1973 |
|---|---|---|
| DE | 44 39 448 B1 | 2/1996 |

(Continued)

*Primary Examiner* — David D Le
*Assistant Examiner* — David J Hlavka
(74) *Attorney, Agent, or Firm* — Davis & Bujold, P.L.L.C.

(57) ABSTRACT

A clutch system for producing and interrupting a force flow between the engine and transmission of a motor vehicle, with a clutch, which is disengaged unless actuated, and one or more valves, which regulate the flow of pressure medium and which are electrically actuated by a control and regulation unit. If there is electrical failure while driving and when a gear is engaged or when the vehicle is stationary, the engine is running and a transmission gear is engaged, unintended clutch engagement is prevented. The valves are designed such that if there is a failure of the voltage supply and consequently also of the actuation of the valves by the electronic control and regulation system, the operating condition of the clutch existing at the time of failure, namely the disengaged or engaged operating condition, remains as it is.

14 Claims, 4 Drawing Sheets

U.S. PATENT DOCUMENTS

| | | |
|---|---|---|
| 2004/0166988 A1 | 8/2004 | Zimmermann et al. |
| 2008/0202886 A1 | 8/2008 | Röether et al. |

FOREIGN PATENT DOCUMENTS

| | | |
|---|---|---|
| DE | 198 56 297 A1 | 6/2000 |
| DE | 100 18 677 A1 | 10/2001 |
| DE | 102 31 789 A1 | 2/2003 |
| DE | 103 38 355 A1 | 3/2005 |
| DE | 10 2004 018 962 B3 | 10/2005 |
| DE | 10 2006 012 838 A1 | 11/2006 |
| EP | 0 710 580 A1 | 5/1996 |
| EP | 0 926 401 A2 | 6/1999 |
| EP | 1 522 754 A1 | 4/2005 |
| FR | 2 829 541 A1 | 3/2003 |
| WO | WO-2004/053349 A1 | 6/2004 |
| WO | 2006123079 A2 | 11/2006 |

\* cited by examiner

CLUTCH SYSTEM

This application is a national stage completion of PCT/EP2007/056545 filed Jun. 29, 2007, which claims priority from German Application Serial No. 10 2006 035 134.7 filed Jul. 29, 2006.

FIELD OF THE INVENTION

The invention concerns a clutch system.

BACKGROUND OF THE INVENTION

Automatic clutch systems with wet or dry clutches which, to transfer torque, are held by spring force in the engaged or closed condition and are changed by way of a pneumatic, hydraulic or electric actuator to a disengaged or open condition, have been known for a long time. Owing to the comparatively high component complexity and to the path control necessitated for the then usual spring characteristics, clutch systems so formed are relatively expensive. However, when used in vehicles they have the great advantage that in the event of a failure in the electric, pneumatic or hydraulic system for controlling and actuating the clutch during driving, an engaged drive train is maintained which, in such a case, is the safe and desired operating condition to be aspired to.

On the other hand, automatic clutch systems are also known in which, when not actuated, the clutch is kept in a disengaged condition and can be changed to the engaged or closed condition by the application of pneumatic, hydraulic or electric forces by way of at least one actuator. The disengaged condition can be supported by a spring force.

Actuation of such a clutch can be controlled comparatively easily and inexpensively with an actuator in the form of a piston-cylinder arrangement. Here, the clutch is disengaged by venting or emptying the clutch actuator, whereas to engage the clutch, the clutch actuator is filled with a pressure medium. During this, the pressure is usually controlled by an electromagnetic control and regulation unit. The pressure control during clutch actuation also makes it possible, with the help of the clutch, to transmit various torques in slipping operation. Such clutch systems or clutches, with pressure control by way of known switching values, are known from DE 22 22 184 A1, DE 100 18 677 A1 and WO 2004/053349 A1.

As already mentioned, the switching valves for clutch actuation are electrically controlled by an electronic control and regulation unit. However, if the motor vehicle's voltage supply should fail, proper control of those valves can no longer be guaranteed and with conventional clutch systems, the operating behavior of the motor vehicle can become unforeseeable for the driver.

Thus, for the operation of automatic clutch systems, the desired operating behavior is such that, when the motor vehicle is driving, the shifting system is inactive (a gear is engaged) and the clutch control system fails, the drive train remains in an engaged condition and the clutch in an engaged condition. Moreover, the operating behavior of the automatic clutch system, when the motor vehicle is stationary, the engine is running and a starting gear is engaged, should be such that in the event of clutch control failure, with the help of the clutch the drive train is disengaged and the clutch brought to or kept in a disengaged condition.

Against this background, the purpose of the present invention is to provide a comparatively simple and inexpensive automatic clutch system with a "pressure-engaged" clutch which, in the event that the voltage supply for the clutch control system should fail, will ensure that during driving and when shifting, is inactive the full clutch torque or at least a defined part of it is transferred, and which, when the motor vehicle is stationary, the engine is running and a transmission gear is engaged, will prevent the spontaneous engagement or engaging of the clutch.

In this context a "pressure-engaging" clutch is understood to be a clutch of the type described above, such that the clutch is engaged and torque-transferring when an actuating force is applied to it via at least one pressure-operated actuator.

SUMMARY OF THE INVENTION

The invention is based on the recognition that with conventional automatic clutch systems, in the event that the voltage supply for a clutch control and regulation device should fail, clutch operation conditions which are not directly foreseeable and undefined can arise, which occur within a very short time and which cannot be sufficiently well mastered by the driver.

Thus, the invention starts with a clutch system for producing and interrupting a force flow between the engine and the transmission of a motor vehicle, with a clutch which, in the non-actuated condition, is in a disengaged condition, but which can be changed to an engaged operating condition by way of at least one clutch actuator that can be acted upon by pneumatic or hydraulic pressure and with one or more valves arranged in a pressure line system of a control valve arrangement, which regulate the volume flow of the pressure medium and which can be controlled electrically by an electronic control and regulation unit.

In the event of a failure of the voltage supply, in order to ensure that while driving, and with the inactive gearshift and an engaged gear, the full clutch torque or a defined part of it is transferred and, when the motor vehicle is stationary, the engine is running and a transmission gear is engaged to prevent spontaneous engagement or engaging of the clutch, it is provided that the valves or valve are designed such that if the voltage supply fails and the electronic control and regulation unit is therefore no longer able to control the valves or valve, the operating condition of the clutch existing at the time, namely disengaged or engaged, remains as it is.

According to a first embodiment, at least one controllable valve for filling and at least one controllable valve for emptying the clutch actuator are provided, these valves being designed as "closed unless actuated" valves. This means that in their rest condition the valves are in their closed position.

According to a second embodiment of the invention, at least one controllable valve for filling and at least one controllable valve for emptying the clutch actuator are provided, at least one controllable valve for filling being designed as an "open unless actuated" valve while, in contrast the valve(s) for emptying is/are designed as "closed unless actuated" valves, and a bistable reversing valve is connected upstream from the controllable filling valve(s) which, depending on the existing operating condition of the clutch, is switched to a setting such that if the voltage supply fails, the operating condition of the clutch existing at the time remains as it is.

In this connection an "open unless actuated" valve is understood to be a valve which, in its rest condition, is in a position which allows the pressure medium to pass through.

According to a third embodiment of the invention, at least one controllable valve for filling and at least one controllable valve for emptying the clutch actuator are provided, such that at least one controllable valve for filling and a controllable valve for emptying are designed as "open unless actuated" valves, and a bistable reversing valve associated with the "open unless actuated" valves is arranged in the forward and return directions of the pressure line system and switched, as a function of the current operating condition of the clutch, in such a manner that, if the voltage supply fails, the operating condition of the clutch existing at the time remains as it is.

Preferably, for filling and emptying or venting at least two valves are provided in each case, since this gives greater security against malfunction by virtue of redundancy and improved dynamics in the actuation of the valves. In related tests, 2/2-way valves have proved satisfactory as controllable valves for filling and emptying.

Finally, according to a fourth embodiment of the invention, a clutch system having a pressure-regulating valve is proposed, which is designed in such a manner that if not electrically actuated it is disengaged, or if not electrically actuated it is engaged, or if not electrically actuated, it remains in whichever switching condition it was in previously.

As the invention also envisages, the valve or valves for controlling the pressure in the pressure lines of the clutch system can be actuated by pulse width modulation or pulse frequency modulation, in particular in order to avoid disadvantageous oscillations in the system.

In addition, it is proposed to integrate at least one non-return valve in the pressure medium delivery line of the pressure line system. By virtue of this measure, the pressure or actuation system and thus also an engaged clutch are protected against sudden pressure loss, because of a defective delivery line.

Furthermore, it has been found expedient to integrate at least one pressure sensor in the pressure line system, which is connected to the control and regulation unit for signal transmission.

As the invention also envisages, the clutch can be a wet or a dry clutch.

Furthermore it is considered expedient, in the event of any failure of the voltage supply, that this should be indicated to the driver visually and/or acoustically, and/or should be accompanied by a visually displayed recommendation for action by the driver.

BRIEF DESCRIPTION OF THE DRAWINGS

The invention will now be described, by way of example, with reference to the accompanying drawings in which.

DETAILED DESCRIPTION OF THE INVENTION

Figure 1:
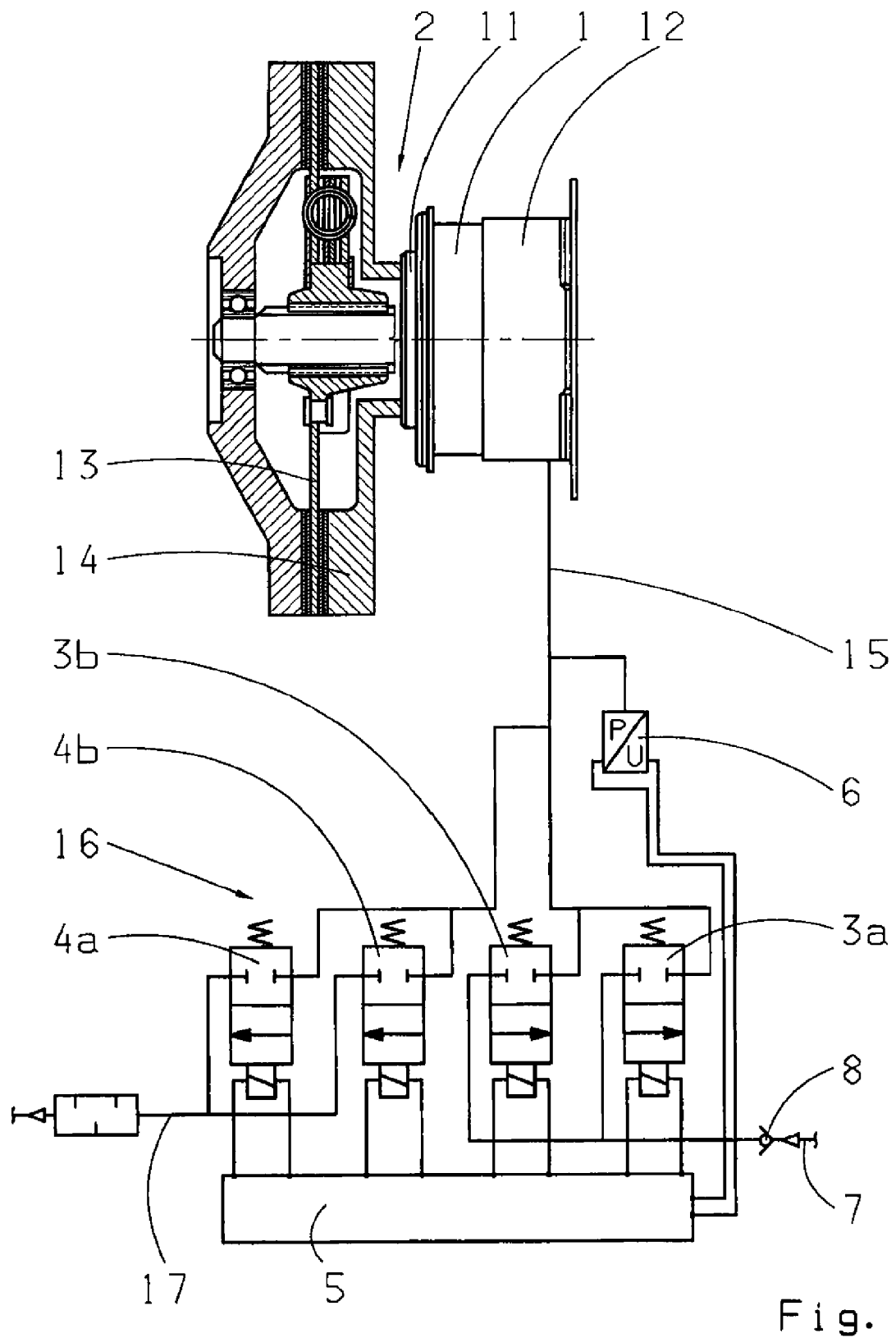
FIG. 1 is a clutch system in a first embodiment, according to the invention.

Thus, FIG. 1 shows a schematic automatically acting clutch system for producing and interrupting a force flow, between a drive engine and a transmission of a motor vehicle. These two are not shown separately.

This clutch system comprises a clutch 2 formed as a friction clutch, which can be actuated by a clutch actuator 1 formed as a piston-cylinder arrangement. The clutch 2 is a "pressure-engaged" clutch, which in the non-actuated condition is kept by spring force in a disengaged or open operating condition, but which can be changed to an engaged or closed operating condition against the spring force by way of at least of the clutch actuator 1 incorporated in a pressure line system and which can be acted upon by pressure.

The clutch 2 can be made as a wet or dry clutch. The principle of the structure of such a clutch 2, with its clutch disk 13, a contact pressure plate 14, spring elements, etc., has been known for a long time so there is no need to explain the details thereof. In this connection, in particular reference can be made to the documents of the prior art mentioned at the beginning.

The clutch actuator 1 can be made as a pneumatically or hydraulically actuated piston-cylinder arrangement so that the pressure medium can be either a pressure gas such as air or a liquid such as a suitable pressure oil, as the case may be. In the embodiments of the invention described here, in each case pneumatically actuated clutch systems are described. The clutch actuator 1 essentially consists of a piston 11 which is inserted and can move axially within a cylinder 12 that can be pressurized and which acts with its free end on radially inner sections of the pressure plate 14 of the clutch 2.

The inflow and outflow of pressure medium to or from the clutch actuator 1 take place through a pressure medium line 15, opening into the inside space of the cylinder 12, which is connected to a central valve arrangement 16 of a control and regulation unit.

As can also be seen in FIG. 1, in the control valve arrangement 16, two controllable valves 3a, 3b for filling and two controllable values 4a, 4b for emptying the clutch actuator 1 are associated with it. Although it is true that only one controllable valve 3 for filling and one controllable valve 4 for emptying could be provided (this is not illustrated), for reasons of redundancy and improved actuation dynamics at least two respective valves 3 and 4 in the control valve arrangement 16 are preferred.

The controllable valves 3a, 3b and 4a, 4b consist of electromagnetically actuated 2/2-way valves and are connected to receive signals from an electronic control and regulation unit 5. However, the invention is not limited to a control valve arrangement 16 with 2/2-way valves, but includes any conceivable type of control valves that can be controlled and are suitable for the present application.

In addition, associated with the electronic control and regulation unit 5 is a pressure sensor 6, which continuously determines measured values of the existing pressure acting at the clutch actuator 1 and transmits them to the control and regulation unit 5 for the generation of control signals for actuating the valves 3a, 3b and 4a, 4b.

According to the invention, the spring-loaded valves 3a, 3b and 4a, 4b are designed so that should the voltage supply and hence the actuation of the valves by the electronic control and regulation unit 5 fail, the operating condition of the clutch 2 existing at the time, namely its disengaged or engaged operating condition, remains as it is.

Thus, in the present case all the valves 3a, 3b and 4a, 4b for filling and venting are designed as "closed unless actuated" valves 3a, 3b and 4a, 4b, which means that the rest position of the values corresponds to their closed position. To produce this switching function, restoring springs (not shown) act upon each of the valves 3a, 3b, and 4a, 4b, which return the valves to their closed position unless the valves are energized by a current.

The engagement or engaging of the clutch 2, for example during starting off, maneuvering and during transmission shift processes, takes place by way of defined actuation of the valves 3a, 3b for passing air into or filling the cylinder 12 of the clutch actuator 1, while in contrast, the disengagement or disengaging of the clutch 2 is carried out by defined actuation of the valves 4a, 4b for venting or emptying the cylinder 12 of the clutch actuator 1. The return movement of the piston 11 of the clutch actuator 1 is driven by a restoring spring (not shown). The pressure medium then passes out of the cylinder 12, via the pressure medium line 15 and the valves 4a, 4b of the control valve arrangement 16, to an outflow line 17.

Quantitative control of the gas volume (air) if the clutch actuator 1 is pressurized pneumatically, or of the liquid volume (pressure oil) if the clutch actuator 1 is pressurized hydraulically, can be effected by pulse-width-modulated or by pulse-frequency-modulated actuation of the valves 3a, 3b; 4a, 4b, where disadvantageous oscillations in the pressure line system are very largely avoided.

The transmission behavior of the clutch 2 or the torque variation is determined by pressure regulation with the help of the pressure sensor 6 mentioned earlier and by cycle timing of the valves 3a, 3b; 4a, 4b for filling and venting.

Given the case that there has been a voltage supply failure, the operating condition of the clutch 2 existing at the time is always maintained as the desired condition. This can be the engaged operating condition while driving or the disengaged operating condition of the clutch 2 while the vehicle is at rest since, as mentioned, the valves 3a, 3b; 4a, 4b are designed as "closed unless actuated" valves 3a, 3b; 4a, 4b and they, therefore, prevent any undesired pressure build-up or pressure drop in the pressure line system if the voltage supply fails.

During driving the pressure built up in the system and hence the pressure in the cylinder 12 of the clutch actuator 1 is maintained in order to ensure that the clutch 2 is engaged and that the drive train is therefore engaged, whereas in contrast, at rest and with the engine running, to ensure that the clutch 2 is disengaged, a pressure build-up in the cylinder 12 and hence starting of the motor vehicle, due to unintentional engagement of the clutch 2, are prevented.

It is advantageous for a voltage supply failure to be indicated to the vehicle's driver visually and/or acoustically, and/or to be accompanied by a visually displayed behavior recommendation for the driver so that while the motor vehicle is driving, with the drive train engaged the driver can safely drive out of the traffic and bring the vehicle to a suitable stopping location.

Furthermore, in order to protect the pressure line or actuation system, and thus also the clutch 2 perhaps in the engaged condition against sudden pressure loss that possibly results from a defective pressure medium delivery line 7, a one-way valve 8 is integrated in the latter.

Figure 2:
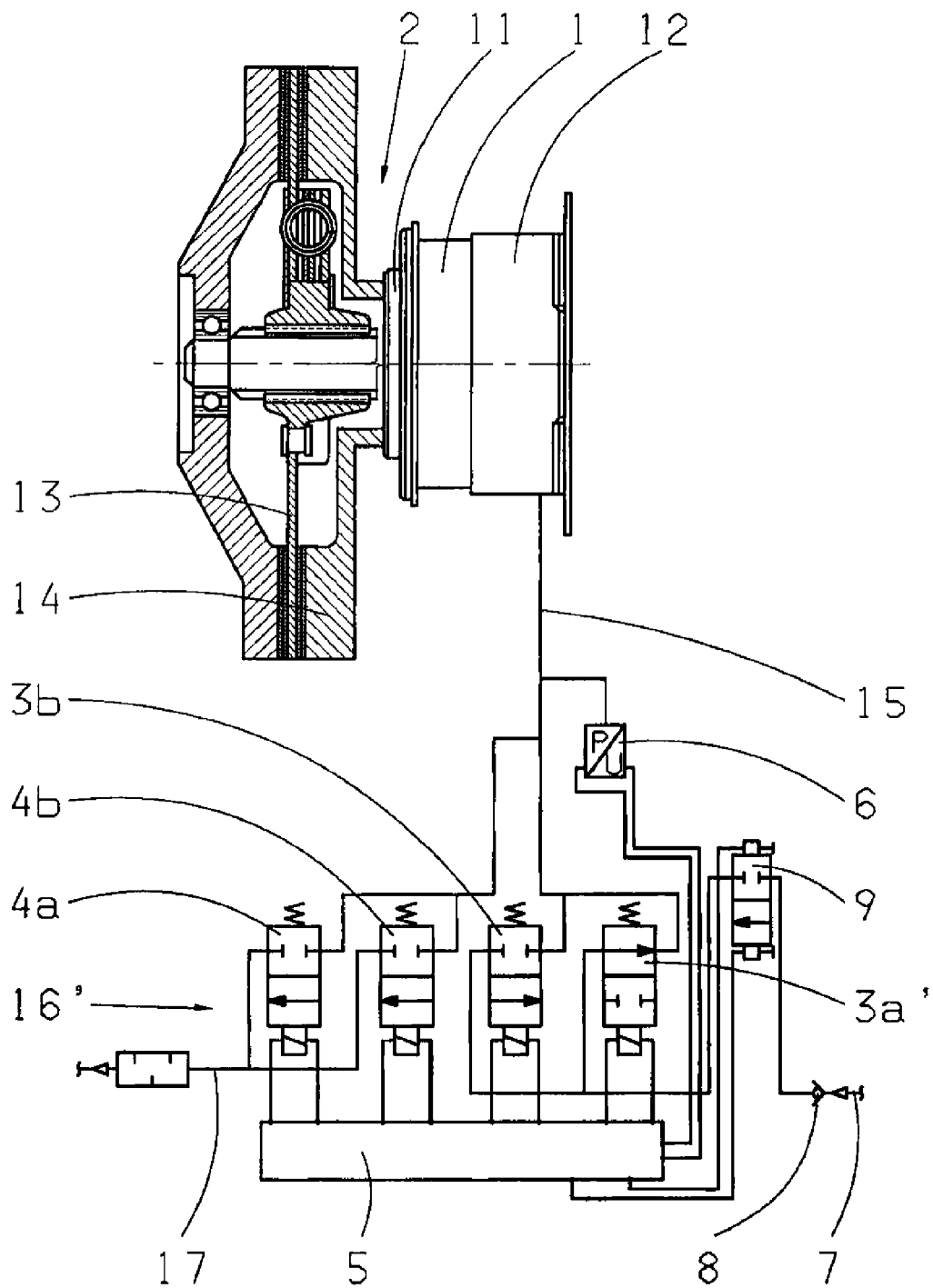
FIG. 2 is a similar clutch system in a second embodiment.

A control valve arrangement 16' in the embodiment, according to FIG. 2, differs from the embodiment described above, first, in that at least one controllable valve 3a, 3b for pressurizing with air, in this case a valve 3a', is made as an "open unless actuated" valve, whereas the controllable valve 3b is made, as before, as a "closed unless actuated" valve. As in the example according to FIG. 1, the controllable valves 4a and 4b are made as "closed unless actuated" valves 4a, 4b. In relation to the valve 3a', this means that when the valve 3a' is in a rest situation, i.e., not acted upon by an energizing current and so, if the control and regulation unit 5 has failed, it is in a switching position which allows the pressure medium to pass through.

Given the situation that the motor vehicle is driving and the voltage supply fails, then since the valve 3a' is in its rest position the clutch 2 is engaged and, owing to the continuing supply of the clutch actuator 1 with pressure medium, the clutch remains safely engaged or closed, where the range of driving with an engaged clutch in this malfunction situation is advantageously extended and any design-related leakiness of the pressure line system can be compensated.

For a motor vehicle at rest this concept entails additional measures since, when the engine is running, a gear is engaged and there is a failure of the voltage supply for the electronic control and regulation unit 5 and/or the electromagnets of the controllable valves 3a', 3b; 4a, 4b the motor vehicle would start off spontaneously.

To prevent that situation effectively, a bistable reversing valve 9 is connected upstream from the controllable valves 3a', 3b for pressurizing or filling the cylinder 12 of the clutch actuator 1 which, depending on the existing operating condition of the clutch 2, is always switched so that if the voltage supply should fail, the existing operating condition is maintained as the desired condition.

Accordingly, during driving the reversing valve 9 is switched so as to allow passage for filling so that a constant pressure supply to the clutch actuator 1 is enabled. When the motor vehicle comes to rest, the bistable reversing valve 9 is automatically switched to its blocking position so that if the voltage supply fails, no pressure is built up for activating the clutch actuator 1 and spontaneous starting of the motor vehicle is therefore prevented.

Figure 3:
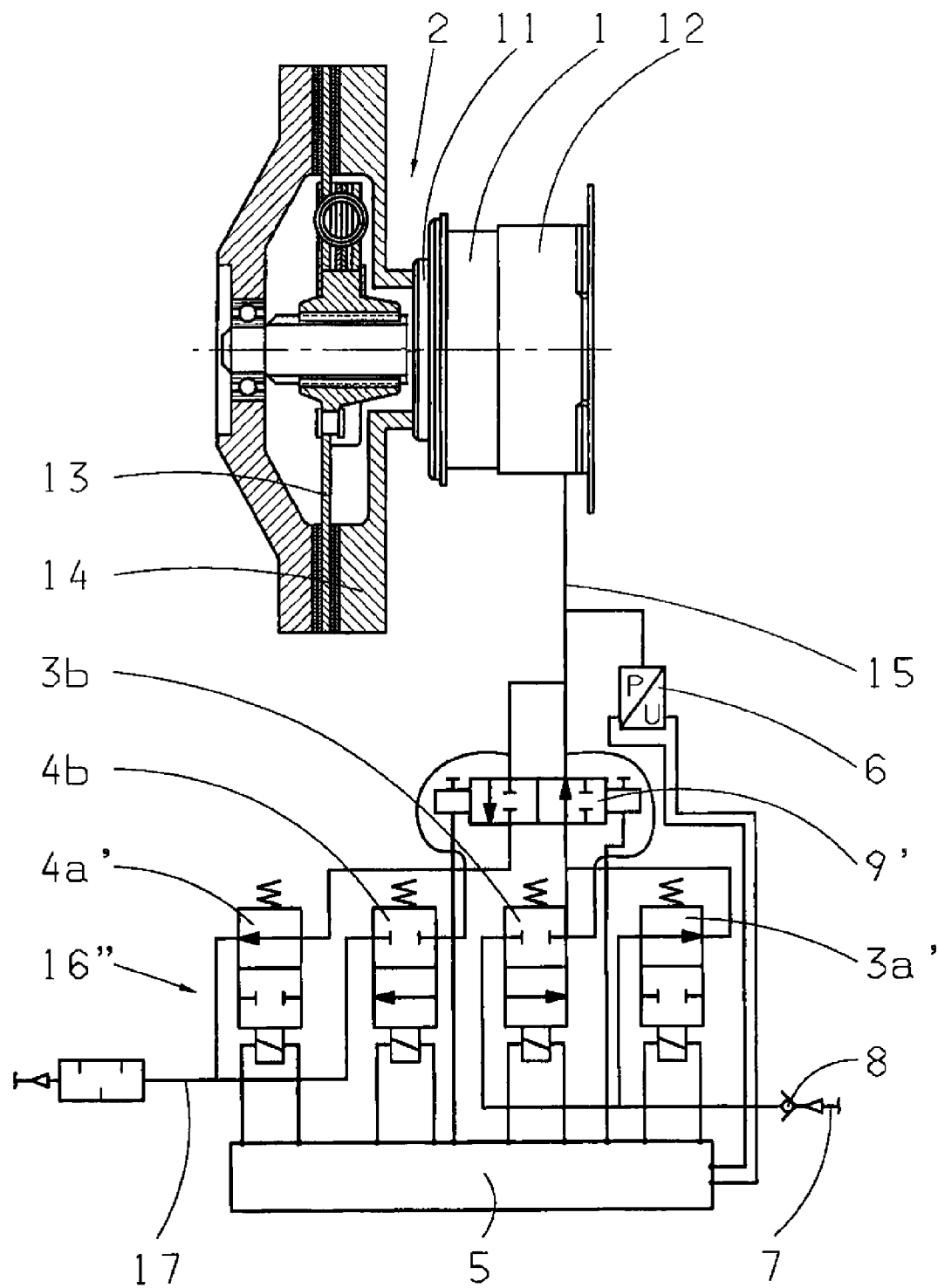
FIG. 3 is a clutch system in a third embodiment, according to the invention.

The control valve arrangement 16" in the design embodiment, according to FIG. 3, is characterized in that at least one controllable valve 3a' for filling and a controllable valve 4a' for emptying are made as "open unless actuated" valves 3a', 4a'.

Furthermore, a bistable reversing valve 9' is associated with the two "open unless actuated" valves 3a' and 4a', arranged in the forward and return flow of the pressure line system and, depending on the existing operating condition of the clutch 2, switched in such manner that if the voltage supply should fail, the operating condition of the clutch 2, existing at the time, is maintained.

In this case, the other two valves 3b and 4b for pressurizing and venting the cylinder 12 of the clutch actuator 1 are made as "closed unless actuated" valves 3b; 4b. However, they can also be made as "open unless actuated" valves (not illustrated here), which then, however, makes it necessary to subordinate them as well directly to the bistable reversing valve 9'.

The engagement or engaging of the clutch 2, for example during starting, maneuvering and transmission gearshifts, takes place by defined actuation of the valve 3a', in this case "open unless actuated", and/or of the "closed unless actuated" valve 3b for filling, in combination with the bistable reversing valve 9' which has to be actuated correspondingly.

In contrast, the clutch 2 is disengaged or opened by defined actuation of the valve 4a, in this case "open unless actuated", and/or of the "closed unless actuated" valve 4b for venting, in combination with the bistable reversing valve 9' which must be actuated appropriately.

If the voltage supply should fail during driving, the clutch 2 is engaged and remains safely closed, since by virtue of the bistable reversing valve 9' correspondingly switched to allow passage for filling and to its blocking position for emptying, as well as the "open unless actuated" valve 3a' for pressurizing, the clutch actuator 1 is constantly pressurized.

When the motor vehicle is stationary, the bistable reversing valve 9' is switched to its blocking position for filling and to its pass-through position for emptying so that, if the voltage supply fails, no pressure can be built up in the clutch actuator 1 and inadvertent starting of the motor vehicle is prevented.

Figure 4:
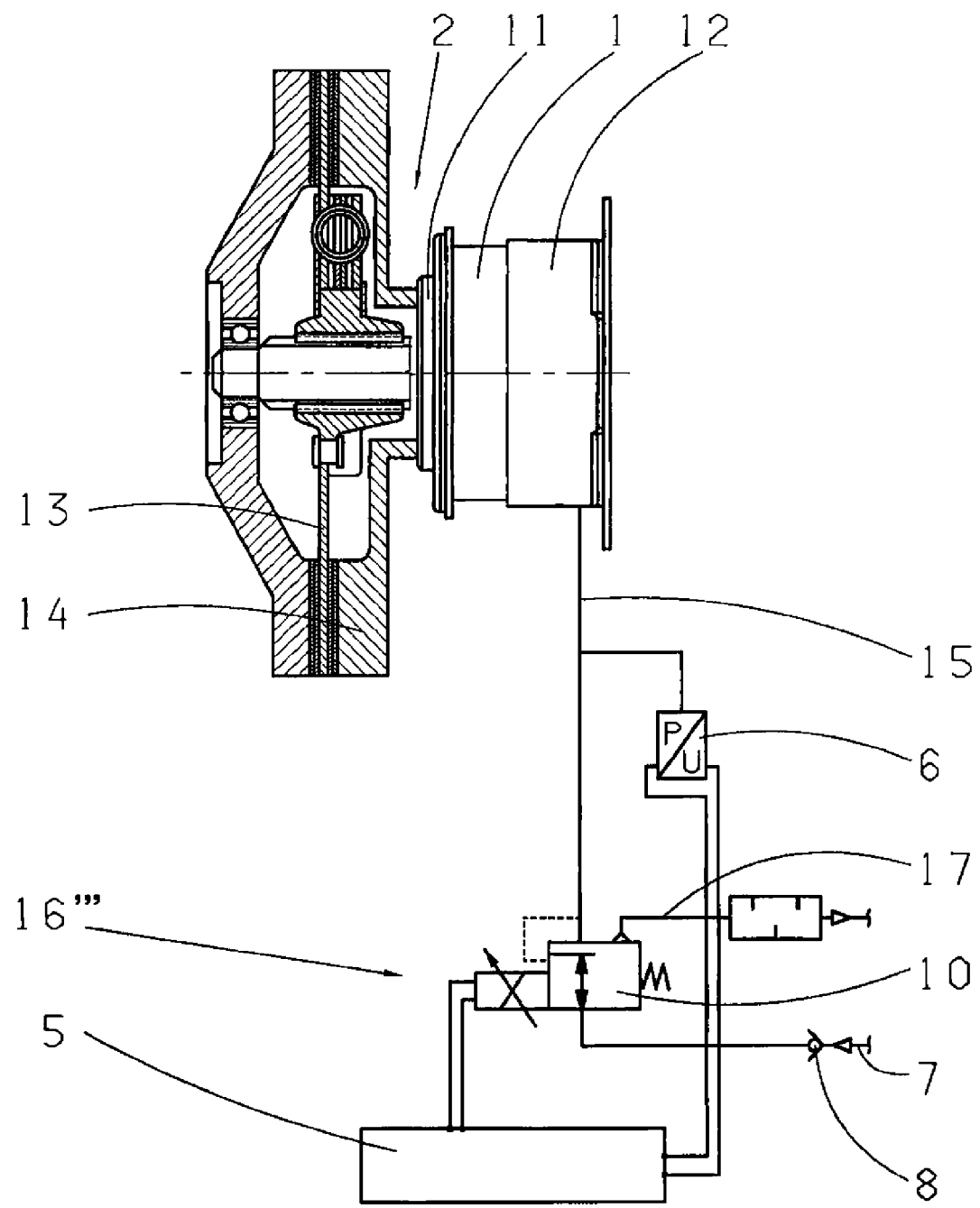
FIG. 4 is a clutch system in a fourth embodiment, according to the invention.

The example embodiment, illustrated in FIG. 4, differs in relation to a control valve arrangement 16''' from all the other control valve arrangements 16, 16' and 16", shown in FIGS. 1 to 3 and described earlier, in that this embodiment makes do with a single controllable valve, namely a pressure regulation valve 10.

By analogy with the example embodiments described earlier, the engagement and disengagement of the clutch 2 and the behavior of the clutch control system in case of failure can be determined by the design of the pressure regulation valve 10, namely which can be open unless actuated electrically or closed unless actuated electrically, or maintained in the condition to which it was last switched unless actuated electrically.

The effects and any measures possibly to be adopted correspond to those in the embodiments shown in FIGS. 1 to 3.

The transmission behavior of the clutch 2 (torque variation) is adapted with the help of the pressure regulation valve 10. A pressure sensor 6 can additionally monitor the system.

Reference Numerals 1 clutch actuator
2 clutch
3a controllable valve for filling the cylinder 12
3a' controllable valve for filling the cylinder 12
3b controllable valve for filling the cylinder 12
4a controllable valve for emptying the cylinder 12
4a' controllable valve for emptying the cylinder 12
4b controllable valve for emptying the cylinder 12
5 control and regulation unit
6 pressure sensor
7 pressure medium delivery line
8 one-way valve
9 reversing valve
9' reversing valve
10 pressure regulation valve
11 piston
cylinder
clutch disk
contact pressure plate
pressure medium line
16 control valve arrangement
16' control valve arrangement
16" control valve arrangement
16"' control valve arrangement
outflow line

The invention claimed is:

1. A clutch system for producing and interrupting a force flow between an engine and a transmission of a motor vehicle, the clutch system comprising:
one of a hydraulic fluid and a pneumatic fluid comprising a pressure medium;
a clutch (2) being arranged between the engine and the transmission and normally being in a disengaged operating condition unless actuated and being actuatable by way of a pressure medium pressurizable clutch actuator (1) to an engaged operating condition, and
at least one valve arranged in a pressure line system of a control valve arrangement (16), which regulates a volume flow of the pressure medium and being electrically actuatable by an electronic control and regulation unit (5),
wherein the at least one valve (3a, 3a', 3b; 4a, 4a', 4b; 9, 10) is designed such that if a failure of the voltage supply and consequently a failure of actuation of the at least one valve (3a, 3b; 4a, 4b; 9, 10) by the electronic control and regulation system (5), a currently set operating condition of the clutch (2) existing at a time of the failure remains and is maintained so that if the voltage supply fails during driving and with a gearshift system inactive so that a gear is engaged, transmission of full clutch torque or a defined part thereof is ensured, and if the voltage supply fails when the motor vehicle is at rest, the engine is running and a transmission gear is engaged, an unintended engagement of the clutch is prevented.

2. The clutch system according to claim 1, wherein the clutch system comprises at least one controllable valve (3a, 3b) for filling, and at least one controllable valve (4a, 4b) for emptying the clutch actuator (1), all of the at least one controllable Valve (3a, 3b) for filling, and the at least one controllable valve (4a, 4b) for emptying the clutch actuator (1) are normally closed unless actuated valves (3a, 3b; 4a, 4b).

3. The clutch system according to claim 1, wherein the clutch system comprises at least one controllable valve (3a', 3b) for filling, and at least one controllable valve (4a, 4b) for emptying the clutch actuator (1), the at least one controllable valve for filling is normally open unless actuated valve (3a'), and the at least one controllable valve (4a, 4b) for emptying the clutch actuator (1) are designed as normally closed unless actuated valves (4a, 4b), and in which a bistable reversing valve (9) that transmits pressure is connected upstream from the at least one controllable valve (3a, 3b) for filling, which, depending on the operating condition of the clutch (2) existing at the time of the failure, is switched in such manner that if the voltage supply fails, the operating condition of the clutch (2) existing at the time of the failure remains as is.

4. The clutch system according to claim 1, wherein the clutch system comprises at least one controllable valve (3a', 3b) for filling, and at least one controllable valve (4a', 4b) for emptying the clutch actuator (1), the at least one controllable valve (3a') for filling and the at least one controllable valve (4a') for emptying are normally open unless actuated valves (3a', 4a'), and a bistable reversing valve (9'), which transmits pressure in a forward flow and a return flow of the pressure line system, is associated with the normally open unless actuated valves (3a', 4a'), which, depending on the operating condition of the clutch (2) existing at the time of the failure, is switched in such manner that if the voltage supply fails, the operating condition of the clutch (2) existing at the time of the failure remains as is.

5. The clutch system according to claim 1, wherein at least two valves (3a, 3a', 3b) fill the clutch actuator (1) and at least two valves (4a, 4a', 4b) empty the clutch actuator (1).

6. A clutch system for producing and interrupting a force flow between an engine and a transmission of a motor vehicle, with a clutch (2) normally being in a disengaged operating condition unless actuated and being actuatable by way of one of a pneumatically or a hydraulically pressurizable clutch actuator (1) into an engaged operating condition, and with at least one valve being arranged in a pressure line system of a control valve arrangement (16) for regulating a volume flow of pressure medium and being electrically actuatable by an electronic control and regulation unit (5),
wherein the at least one valve (3a, 3a', 3b; 4a, 4a', 4b; 9, 10) is designed such that if a failure of the voltage supply and consequently a failure of actuation of the at least one valve (3a, 3b; 4a, 4b; 9, 10) by the electronic control and regulation system (5), a currently set operating condition of the clutch (2), existing at a time of the failure, remains and is maintained so that if the voltage supply fails during driving and with a gearshift system inactive with a gear is engaged, transmission of full torque or a defined portion thereof is ensured, and if the voltage supply fails when the motor vehicle is at rest, the engine is running and a transmission gear is engaged, an unintended engagement of the clutch is prevented; and
the valves (3a, 3a', 3b; 4a, 4a', 4b) for filling and emptying the clutch actuator (1) are 2/2-way valves.

7. The clutch system according to claim 1, wherein the clutch system comprises a pressure regulation valve (10) that is one of open unless actuated electrically, closed unless actuated electrically, or remains in a previously switched condition unless actuated electrically.

8. The clutch system according to claim 1, wherein the at least one valve (3*a*, 3*a*', 3*b*; 4*a*, 4*a*', 4*b*; 9; 10), for controlling the pressure in the pressure line system of the control valve arrangement (16, 16', 16'', 16'''), is actuated by one of pulse-width modulation or pulse-frequency modulation.

9. The clutch system according to claim 1, wherein a one-way valve (8) is integrated in a pressure medium delivery line (7) of the pressure line system.

10. The clutch system according to claim 1, wherein at least one pressure sensor (6) is integrated in the pressure line system and transmits signals to the electronic control and the regulation unit (5).

11. The clutch system according to claim 1, wherein the clutch (2) is one of a wet clutch or a dry clutch.

12. The clutch system according to claim 1, wherein the failure of the voltage supply is at least one of indicated visually and acoustically to a driver of the vehicle.

13. The clutch system according to claim 12, wherein the failure of the voltage supply is signaled by a visually displayed recommendation for action by the driver of the vehicle.

14. A clutch system for controlling a flow of force between an engine and a transmission of a motor vehicle, the clutch system comprising:
  a clutch (2), arranged outside of the transmission and between the engine and the transmission, which is disengaged when un-actuated and engaged when actuated;
  a clutch actuator (1) being pressurized by one of a pneumatic or a hydraulic pressure medium for actuating the clutch (2);
  at least one valve (3*a*, 3*a*', 3*b*; 4*a*, 4*a*', 4*b*; 9; 10) being arranged in a pressure line system of a control valve arrangement (16) and regulating a flow of the pneumatic or the hydraulic pressure medium, within the pressure line system, to the clutch actuator (1), and the at least one valve (3*a*, 3*a*', 3*b*; 4*a*, 4*a*', 4*b*; 9; 10) being actuated electrically by an electronic control and regulation unit (5); and
  the at least one valve (3*a*, 3*a*', 3*b*; 4*a*, 4*a*', 4*b*; 9; 10) always retaining engagement of the clutch (2) during a failure of voltage supply, if immediately before failure of the voltage supply the clutch is engaged, the motor vehicle is driving and a transmission gear is engaged, such that the clutch (2) continues transmission of at least a portion of torque being transmitted at a time failure of voltage supply, and the at least one valve (3*a*, 3*a*', 3*b*; 4*a*, 4*a*', 4*b*; 9; 10) always preventing engagement of the clutch (2) during the failure of the voltage supply, if immediately before failure of the voltage supply the clutch is disengaged, the motor vehicle is stationary, the engine is running and a transmission gear is engaged.

\* \* \* \* \*